United States Patent Office 3,392,024
Patented July 9, 1968

3,392,024
GELATIN SILVER HALIDE PHOTOGRAPHIC EMULSIONS CONTAINING POLYFUNCTIONAL AZIRIDINYL COMPOUNDS
Donald M. Burness, Rochester, N.Y., assignor to Eastman Kodak Company, Rochester, N.Y., a corporation of New Jersey
No Drawing. Filed June 1, 1965, Ser. No. 460,575
7 Claims. (Cl. 96—111)

ABSTRACT OF THE DISCLOSURE

Polyaminoaziridine compounds which can be prepared by reacting two moles of ethylenimine with one mole of certain doubly unsaturated compounds stabilize or harden proteinaceous materials such as gelatin. The aziridine compounds can be incorporated in gelatin silver halide photographic emulsions. Bis[2-(1-aziridinyl)ethyl]sulfone which can be prepared by reacting ethylenimine with divinyl sulfone is illustrative of the aziridine compounds.

---

This invention relates to the stabilizing or hardening of proteinaceous materials and particularly gelatin using as the stabilizer or hardener a material prepared by reacting two moles of ethylenimine and one mole of a doubly unsaturated compound.

Proteins often exhibit poor stability which may be due to the effect of water either in liquid or gaseous form. Thus gelatin layers when immersed in water and without stabilizing agent may become soft or at moderate temperatures may even disintegrate or lose their form. Proteins in fibrous form such as wool may in certain aqueous treatments exhibit shrinkage or become otherwise unstable. Much thought has been given to various treatments for proteinaceous materials which would render those materials resistant to the damaging effect from various aqueous conditions which those proteinaceous materials might encounter in use. For instance, in photographic uses photographic gelatin layers such as silver halide emulsions are subjected to aqueous processing baths and in the absence of stabilization or hardening those gelatin layers may suffer adverse effects.

One object of my invention is to so treat proteinaceous material that that material is rendered somewhat resistant to the effect of aqueous conditions. Another object of of my invention is to provide a treatment of proteinaceous material with certain compounds which result from reacting two moles of ethylenimine and one mole of a compound having two unsaturated bonds therein. Other objects of my invention will appear herein.

I have found that by treating proteinaceous materials with the reaction product of two moles of ethylenimine and one mole of a compound having activated double bonds that considerable stability against the effects of moisture is imparted thereto. In its broadest aspects, my invention comprises reacting the proteinaceous material with a polyfunctional aminoaziridine compound such as prepared by reacting ethylenimine with one of the following compounds:

(1) Divinyl sulfone (2) 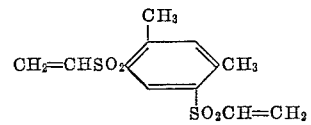

(3) $CH_2=CHCO(CH_2)_4COCH=CH_2$

Ordinarily the treatment involves the use of an aqueous solution of the polyfunctional aziridine compound upon the protein. For instance, if the protein is gelatin the polyfunctional aminoaziridine compound may be mixed with the gelatin in aqueous solution and the resulting composition may be coated out onto a support and subjected to drying by the use of a current of warm dry air whereby a support having a *stabilized* gelatin coating thereon is obtained. If the composition to be coated out onto a support is a silver halide gelatin photographic emulsion, the stabilizing material (hardener) is added thereto in a stabilizing amount ordinarily in a proportion of 0.5 to 5% based on the weight of the gelatin and the photographic emulsion is then coated out onto a support such as a film base or paper base and dried to obtain photographic film or photographic paper. If the proteinaceous material is in solid form such as in the form of a coating, fiber or the like it may then be subjected to treatment with an aqueous solution of the stabilizing material and the layer is then subjected to drying either at room temperature or by the use of an elevated temperature.

The stabilizers or hardeners in accordance with my invention are characterized by the following formula

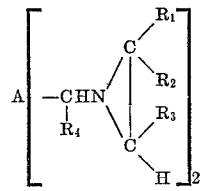

in which $R_1$, $R_2$, $R_3$ and $R_4$ may be hydrogen or lower alkyl and A is sulfone-containing alkylene, e.g., $$-(CH_2)_n-SO_2-(CH_2)_n-$$

each $n$ being an integer of 1–4, sulfone-containing arylene, e.g.,

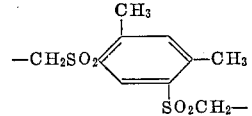

ketone-containing alkylene, e.g., $$-CH_2CO(CH_2)_nCOCH_2-$$

where $n$ is an integer from 1–8, or ketone-containing arylene, e.g.,

The following example illustrates the preparation of bis[2-(1-aziridinyl)ethyl]sulfone.

Example

To 20 parts of ethylenimine at less than 10° C. was added with stirring 18.3 parts of divinyl sulfone in a dropwise maner. The temperature was held at 15–20° C. for two hours and the excess amine was removed using the water pump. The residue was distilled in vacuo to give 27.4 pats of straw colored oil. This oil solidified at 36.5–39.5° C. Recrystallization from ether gave large, colorless needles having a melting point of 37.5–39° C. Reference is made to Bestian, Ann., 566, 238 (1950), relating to the preparation of this compound.

Compounds were made in a similar manner but using as the material having activated double bonds

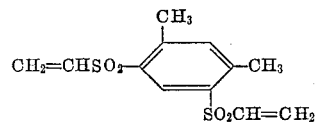

$CH_2=CHCO(CH_2)_4COCH=CH_2$ and

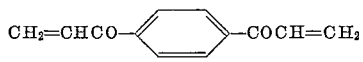

instead of divinyl sulfone. The compounds obtained were

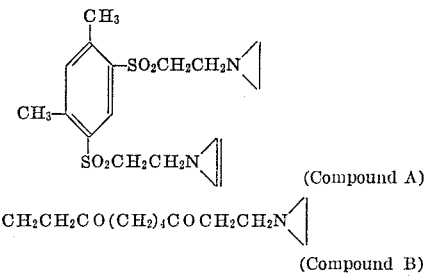

(Compound A)

(Compound B)

and

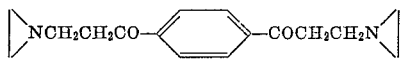

respectively.

Each of the compounds prepared as described was found to be useful for the stabilizing or hardening of proteinaceous materials. For example bis[2-(1-aziridinyl)ethyl]sulfone was incorporated in a gelatin silver halide photographic emulsion in an amount of 1.13% by weight based on the dry weight of the gelatin, the emulsion was coated onto subbed cellulose triacetate film support as was also emulsion without the stabilizer therein. The melting points of the respective emulsion layers were determined, after having been held for one week at 120° F., by immersing each product in water and raising the temperature one degree per second and noting the temperature at which the emulsion layer on the film support disintegrated. The following table shows the effects which were observed with the layers coated on the film support with and without stabilizing material.

| Stabilizer | Percent By Wt. on Dry Gel | M.P. of Emulsion (after 1 week at 120° F.) |
|---|---|---|
| Control | | 84 |
| Bis[2-(1-aziridinyl)ethyl]sulfone | 1.13 | 212 |

Compounds A and B were each incorporated in gelatin-silver halide photographic emulsions in varying proportions and coatings obtained therefrom were compared with coatings not containing stabilizers for degree of swelling in water. This was determined in terms of percentage of the thicknesses of the wet coatings of that of the dry coating. The proportions of stabilizer or hardener used and the percent of swell of the coatings upon immersing in water were as follows:

| Hardener (g. per 139 g. gelatin): | Percent swell in water |
|---|---|
| Control | 780 |
| Compound A (2.4) | 530 |
| Compound A (4.8) | 310 |
| Compound A (7.2) | 250 |
| Control | 910 |
| Compound B (2.1) | 390 |
| Compound B (10.5) | 220 |

Thus it was observed that the stability of the proteinaceous material in which stabilizer had been incorporated was appreciably superior to that of the proteinaceous material to which no stabilizer had been added.

The invention has been described in considerable detail with particular reference to certain preferred embodiments thereof, but it will be understood that variations and modifications can be effected within the sprit and scope of the invention as described hereinabove and as defined in the appended claims.

I claim:

1. A composition of matter comprising gelatin and

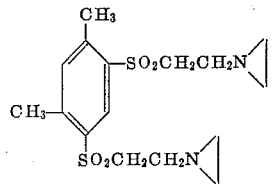

2. A composition of matter comprising gelatin and

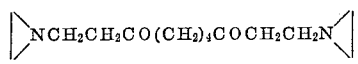

3. A composition of matter comprising gelatin and

4. A gelatin silver halide photographic emulsion containing a compound having the following structure

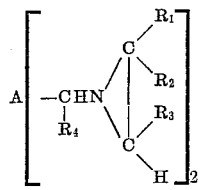

in which $R_1$, $R_2$, $R_3$ and $R_4$ are each selected from the group consisting of hydrogen and lower alkyl and A is selected from the group consisting of sulfone-containing alkylene, sulfone-containing arylene, ketone-containing alkylene and ketone-containing arylene.

5. A gelatin silver halide photographic emulsion containing bis[2-(1-aziridinyl)ethyl]sulfone.

6. A gelatin silver halide photographic emulsion containing

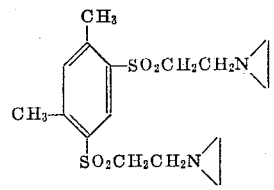

7. A gelatin silver halide photographic emulsion containing

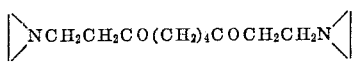

References Cited

UNITED STATES PATENTS

| 3,165,375 | 1/1965 | Tesoro et al. | 8—127.6 |
| 2,950,197 | 8/1960 | Allen et al. | 96—111 |

FOREIGN PATENTS

| 585,892 | 10/1959 | Canada. |
| 1,323,045 | 2/1963 | France. |

NORMAN G. TORCHIN, Primary Examiner.

THOMAS J. HERBERT, JR., Examiner.